UNITED STATES PATENT OFFICE.

CHARLES S. PHILIPS, OF BROOKLYN, NEW YORK.

COMPOUND FOR COLORING TOBACCO.

SPECIFICATION forming part of Letters Patent No. 261,034, dated July 11, 1882.

Application filed April 27, 1882. (No specimens.)

*To all whom it may concern:*

Be it known that I, CHARLES S. PHILIPS, of the city of Brooklyn, in the county of Kings and State of New York, have invented or discovered a new and useful Composition of Matter, being a Compound for Coloring Tobacco; and I do hereby declare the following to be such a full, clear, concise, and exact description thereof as will enable others skilled in the art to which my invention pertains to make and use the same.

The object of my invention is to produce a compound for the purpose of coloring the leaves of tobacco without injury to its burning qualities or flavor.

Heretofore tobacco has been colored by a long process of fermentation or resweating, and with satisfactory results. The only objection to this process is the length of time which it takes, and in certain cases the want of sufficient strength in some tobaccos to undergo the process necessary to produce dark colors without wholly or partially destroying the texture and fiber of the leaf, and in other cases where the tobacco needs only to be colored so as to have a nice appearance.

My present invention consists in using a compound of such a nature as to uniformly color the leaf of the tobacco, whether it need be subjected to the process of resweating or not.

The composition which I use to accomplish my object consists in a mixture of carbon-black and such salts as will neutralize the effect of the carbon-black, so as not to injure the combustion of the tobacco, and which will not be otherwise objectionable, and which will also give the whitest ashes when burned on the cigar, some of which salts are nitrate of lime, acetate of lime, citrate of lime, and malate of lime, also nitrate of potash, citrate of potash, malate of potash, also borax, and others which might be mentioned. These salts, instead of impairing the flavor of tobacco, rather improve it for cigar purposes, as they make the composition unobjectionable and at the same time very beneficial when used in the manner hereinafter described. Borax and potash may be used together if an extra white ash is desirable. In addition to the carbon-black and salts I also use some suitable acid. In order that others may know how to use these ingredients so that they may be beneficial, I will specify one formula which I have found will give excellent results. Lamp-black, eight ounces; acetic acid, twenty ounces; nitrate of potash, sixty ounces; city-refined borax, twenty ounces; and forty gallons of water. While these ingredients mixed in the proportions specified will be found to produce a uniform dark color upon the tobacco when it has been saturated with the mixture, yet I do not limit myself to the precise proportions named, nor to the use of all the ingredients above named in such mixture, as any of the ingredients above specified or their equivalents may be mixed so as to produce desirable colors when a salt, an acid, and carbon-black are used together with water; but the use of carbon-black and an acid or a carbon-black and simply a liquid vehicle does not answer my purpose. I find it best to put the carbon-black in a common water-pail or other small vessel and then pour the acid in onto it and stir it until it is well mixed. It should stand a few hours and then be poured into a larger vessel, after which the water should be added, and it should then be stirred and left standing until settled. When it has settled the scum should be skimmed off with a cloth or other material fine enough to clean the surface of the solution or mixture. The salts may be added at any time most convenient, and after the solution is in a good condition the tobacco should be held in it until it assumes the desirable color, which will be from a few minutes to two or three hours. When the tobacco is removed it may be dried off by hanging or blowers or centrifugal force until it is in a proper condition for further manipulation, or to be packed for future use.

The solution may be varied according to the needs of the tobacco to which it is to be applied. I find it best, however, to make the carbon mixture first, then add one-half ounce of nitrate of potash for each gallon of water and test its effect upon the burning quality of the tobacco to see whether the effect of the carbon-black has been sufficiently neutralized or overcome to prevent any injury to the burning quality of the tobacco, and if not I add another half-ounce of the nitrate of potash for each gallon of water and again test it, and so on until the combustion is satisfactory. Then, if the color of the ashes of the cigar is not white enough, the city-refined borax may be added in the same manner to the carbon and nitrate of potash solution until the color of the ashes is satisfactory. In this way excellent results may be obtained and a large amount of leaf-tobacco designed for wrappers may be greatly enhanced in value. If the tobacco to be colored should, however, be sticky, or so stuck together as not to be shaken out freely, I prefer to warm it in a steam bath until the gum of the leaf is softened enough to allow it to be freely shaken out. This may be done while the tobacco is in its original packages. While the tobacco is being subjected to the coloring process I prefer to have it in a hanging position, so that the liquid may reach every portion of the leaf and thereby color it uniformly.

I am aware that tobacco has heretofore been colored by soaking or thoroughly wetting it in a mixture of carbon-black, acid, and water, and afterward resweating it; but in such case the carbon settles on the leaf in a layer, so that it would give a black ash to the cigar when smoked; and not only this, the carbon deposited on the leaf fills the pores to such an extent that the tobacco so treated is rendered so incombustible that cigars covered or wrapped with such tobacco are utterly worthless, inasmuch as a hard black ring is formed on the outside of the cigar next to the fire while it is being smoked. This ring then cracks and falls off in black patches of flakes and the flavor of the cigar is thereby ruined, because a cigar to be of a good flavor must burn freely, leaving a porous and white or gray ash. It is very well known that a poor-burning filler of a cigar may be materially assisted by a good-burning wrapper; but a poor-burning wrapper will spoil the best filler that can be put into a cigar. I do not therefore claim a composition of carbon-black, acid, and water simply; but What I do claim, and desire to secure by Letters Patent, is—

The herein-described solution for coloring tobacco, consisting of carbon-black, nitrate of potash or equivalent salt, acetic or equivalent acid, and water, when mixed together, substantially as and for the purpose specified.

CHAS. S. PHILIPS.

Witnesses:
HARRY SUYDAM,
J. E. TALBOT.